US009510200B2

(12) United States Patent
Priel et al.

(10) Patent No.: US 9,510,200 B2
(45) Date of Patent: Nov. 29, 2016

(54) ELECTRONIC DEVICE AND A COMPUTER PROGRAM PRODUCT

(75) Inventors: Michael Priel, Netanya (IL); Evgeny Margolis, Cupertino, CA (US); Anton Rozen, Gedera (IL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 45 days.

(21) Appl. No.: 14/233,185

(22) PCT Filed: Aug. 9, 2011

(86) PCT No.: PCT/IB2011/053554
§ 371 (c)(1),
(2), (4) Date: Jan. 16, 2014

(87) PCT Pub. No.: WO2013/021240
PCT Pub. Date: Feb. 14, 2013

(65) Prior Publication Data
US 2014/0155027 A1     Jun. 5, 2014

(51) Int. Cl.
*H04W 12/08*     (2009.01)
*G06F 21/10*     (2013.01)
*G06F 21/55*     (2013.01)
*G06F 21/81*     (2013.01)
*G06F 1/32*     (2006.01)

(52) U.S. Cl.
CPC .............. *H04W 12/08* (2013.01); *G06F 21/10* (2013.01); *G06F 21/554* (2013.01); *G06F 21/81* (2013.01); *G06F 1/3237* (2013.01); *G06F 1/3287* (2013.01); *G06F 1/3296* (2013.01); *G06F 2221/2105* (2013.01); *G06F 2221/2141* (2013.01); *Y02B 60/1282* (2013.01)

(58) Field of Classification Search
CPC ....... H04W 12/08; G06F 12/00; G06F 13/24
See application file for complete search history.

(56) References Cited

U.S. PATENT DOCUMENTS

| 6,772,361 | B1 | 8/2004 | Walsh |
| 7,085,979 | B2 | 8/2006 | Kim et al. |
| 7,168,065 | B1 | 1/2007 | Naccache et al. |
| 7,385,491 | B2 | 6/2008 | Doi |
| 2002/0124193 | A1 | 9/2002 | Colman |

(Continued)

FOREIGN PATENT DOCUMENTS

| EP | 0197345 A2 | 10/1986 |
| JP | 2003058428 | 2/2003 |
| JP | 2010501921 | 1/2010 |

OTHER PUBLICATIONS

International Search Report and Written Opinion correlating to PCT/IB2011/053554 dated Mar. 20, 2012.

*Primary Examiner* — Myron K Wyche

(57) ABSTRACT

An electronic device comprises a secured module arranged to store secured data. A component outside the secured module has a normal operating mode with a normal mode operating voltage. An interface is arranged to provide access to the secured module. A voltage monitoring unit is connected to the component and arranged to monitor an operating voltage Vsup of the component. An interface control unit is connected to the voltage monitoring unit and the interface. The interface control unit is arranged to inhibit access to the secured module through the interface when the operating voltage is below a predetermined secure access voltage level, the secure access voltage being higher than the normal mode operating voltage.

20 Claims, 2 Drawing Sheets

(56) References Cited

U.S. PATENT DOCUMENTS

| | | | |
|---|---|---|---|
| 2007/0162675 A1* | 7/2007 | Sugiura | G06F 1/28 710/260 |
| 2008/0112236 A1* | 5/2008 | Takase | G11C 5/143 365/195 |
| 2009/0300312 A1* | 12/2009 | Handschuh | G06F 12/1408 711/166 |

* cited by examiner

US 9,510,200 B2

ELECTRONIC DEVICE AND A COMPUTER PROGRAM PRODUCT

FIELD OF THE INVENTION

This invention relates to an electronic device and a computer program product.

BACKGROUND OF THE INVENTION

For many electronic devices, such as application processors used in mobile phones or other (battery powered) equipment with wireless connections, security and data integrity have become more and more important, since such equipment is more and more used to perform sensitive operations such as payments, digital rights management, etcetera.

Tampering techniques are known to retrieve protected sensitive data, such as passwords, encryption keys, from an electronic device. For example, one of the simplest and still powerful tampering techniques is voltage tampering, when by toggling a chip supply in different ranges and different sequences, a chip can be taken out of its normal behaviour and unauthorized access to secured data be obtained.

To protect the secured data against such tampering, secured data can be stored in a special secured module, which is supplied by a dedicated, monitored, voltage supply. A protection mechanism monitors the supply and takes protective measures in case a tampering event is detected, e.g. by erasing the data in response to detecting a tampering event.

The secured module is connected to other components of the electronic device through an interface which thus allows access to the secured module. In case the electronic device is in a non-operating condition, the secured module isolates itself and the access through the interface is inhibited. However, electronic devices have to operate at increasingly lower operating voltages. Thus, the difference in voltage between the normal mode operating voltage and non-normal mode (e.g. low power mode) operating voltages becomes smaller which renders properly detecting conditions in which the secured module should be isolated more and more complex.

SUMMARY OF THE INVENTION

The present invention provides to an electronic device and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated examples of embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Figure 1:
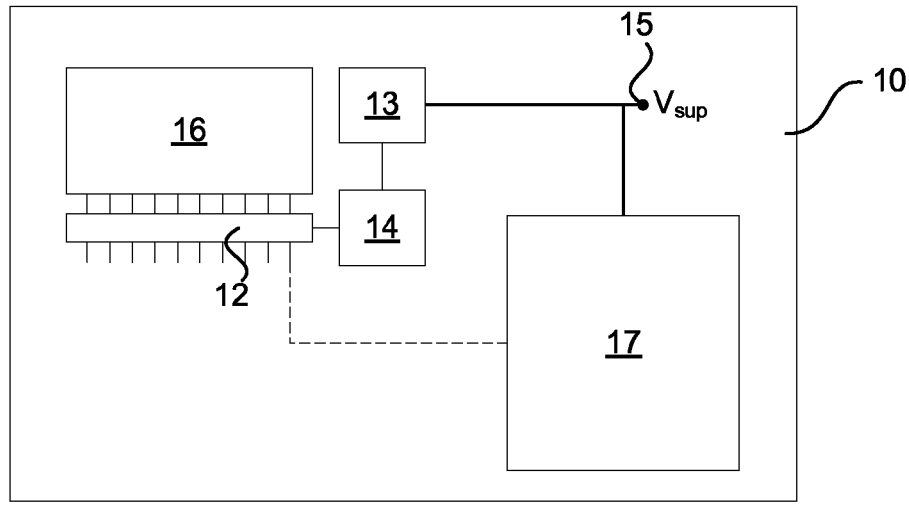
FIG. 1 schematically shows a block diagram of a first example of an embodiment of an electronic device.

Referring to FIG. 1, an example of an electronic device 10 is shown therein. The electronic device 10 may be implemented in any suitable manner. The electronic device may for example be an integrated circuit, a system-on-a-chip, a microprocessor, a battery powered device or other type of electronic device provided with a secured module.

The electronic device 10 comprises a secured module 16 arranged to store secured data. The secured module 16 may for example comprise a secured memory, such as volatile or non-volatile memory, and an encryption module or other circuitry suitable to secure the data stored in the secured memory. For instance, the secured memory may be provided with a tamper protection and serve to securely store sensitive data, such as encryption keys or data that is in the process of being encrypted before it is outputted in encrypted form.

The electronic device 10 further comprises a component 17 outside the secured module 16, i.e. external to the secured module 16. The component 17 has a normal operating mode with a normal mode operating voltage $V_{min}$. An interface 12 is present through which the secured module 16 can be accessed, as indicated by the dashed line, and for example date be read from, or written to, the secured module. In FIG. 1, only the component 17 of the electronic device 10 is shown connected to the interface 12. However it will be apparent that more components, internal and/or external to the electronic device 10, can be connected to the secured module 16 through to the interface 12.

The example of FIG. 1 further comprises a voltage monitoring unit 13, which is connected to the external component 17 and arranged to monitor an operating voltage $V_{sup}$ of the component 17. In the shown example the voltage monitoring unit 13 is connected to a supply node 15, for clarity shown outside the external component 17 but this may also be a node inside the component 17 suitable to monitor the operating voltage $V_{sup}$, in which case the voltage monitoring unit 13 may for example comprise a voltage sensor integrated in the component 17. Furthermore, the operating voltage of the component 17 may be a specific operating voltage specifically generated for that component 17 or the global operating voltage of the electronic device 10.

An interface control unit 14 is connected to the voltage monitoring unit 13 and to the interface 12. The interface control unit 14 is arranged to inhibit access to the secured module 16 through the interface 12 when the operating voltage is below a predetermined secure access voltage level, which is higher than the normal operating voltage. The predetermined secure access voltage level may further be below a maximum operating voltage for the normal operating mode. For example, the normal mode operating voltage can be less than 4 Volt, such as 3 Volt or less, e.g. below or equal to 1.2 V. The normal mode operating voltage may for example be at least 0.9 V. The secure access voltage may e.g. be at least 1.2 V, such as 4 Volt, such as at least 5 Volt, for example 6 Volt. For example the secure access voltage may be at least 1 V.

By selecting a value for the secure access voltage sufficiently higher than the normal operating voltage, the secure access voltage can be accurately detected in a simple manner without requiring a high accuracy in determining the exact voltage operating voltage. Thus, even when the electronic device operates at a low operating voltage when not accessing the secured module and when the difference between the low operating voltage and non-operating voltages (such as when the electronic device is in a low power mode) is relatively small, access to the secured module can be effectively controlled without requiring very precise measurements of the operating voltage. Accordingly, access to the secured module 16 through the interface 12 by other components of the electronic device can be controlled in a simple yet accurate manner. Although other values may be used, it has been found that when the difference between the secure access voltage value and the normal operating voltage is about the same as the difference between the low power mode voltage and the normal operating voltage, access can be accurately controlled even when a normal operating voltage level of 1.0 V differs 0.1 V with the low power mode voltage level.

The external component 17 may be any suitable component. For example the external component may be the core of a microprocessor, such as multimedia processor or other microprocessor. The component may have, in addition to the normal operating mode, one or more non-normal operating modes with operating voltages below the normal mode operating voltage. For example, the component may have a low power mode, in which the operating voltage is lower than in the normal operating mode. The low power mode may for example be, in the order of associated operating voltages from low to high: a sleep mode, drowsy mode, or power gated mode. In a sleep mode, the operating voltage is low and the state of the component is not preserved but can be reinstated, in a drowsy mode the operating voltage is lower than in normal operating mode but the state of the component is preserved, in power gated mode the supply to some parts of the component is cut-off but the other parts are fully operating. For instance, for a normal operating voltage may be in the range of 0.9 and 1.2. V, and the low power operating voltage may be equal to or below 0.8 V, such as 0.7 V or lower The interface 12 may be inhibited in any manner suitable for the specific implementation. As show in FIG. 12, the electronic device may for instance comprise an interface control unit 14 which receives from the voltage monitoring unit 13 an interface enable signal when the operating voltage level is at, or above, the secured access voltage and which receives an interface disabled signal when the operating voltage is below the secured access voltage. As shown, the voltage monitoring unit 13 may have an input for receiving a threshold value $V_{th}$ which indicates the predetermined secure access voltage level. The voltage monitoring unit 13 may have another input for receiving the operating voltage. In the shown example, the voltage monitoring unit 13 is implemented as a simple comparator which compares the voltage received at the other input with the threshold voltage $V_{th}$. and outputs a binary zero in case the received voltage $V_{sup}$ is below the threshold voltage $V_{th}$ and a binary one in case in case the received voltage $V_{sup}$ is equal to or above the threshold voltage $V_{th}$. The interface control unit 14 is connected to the output of the voltage monitoring unit 13, and in this example can receive the binary 1 or 0. In response to receiving the binary one or the zero, the interface control unit respectively enables and disables the interface 12.

The electronic device 11 comprises an operating voltage control module 173 arranged to set the operating voltage to the secure access voltage in case access to the secured module through the interface is requested. I.e. in case the component requires access to the secured module 16, for instance to read or write data, a signal is sent to the operating voltage control module 173. In response to receiving the signal, the operating voltage control module 173 raises the operating voltage to the secured access voltage. The voltage monitoring unit 13 and the interface control unit 14 then respond, as explained above, and access through the interface 12 is enabled.

In addition to the interface control unit 14, the secured module 16 may be provided with other types of tamper protection. For instance, as shown with the example of an electronic device 11 of FIG. 2, the electronic device may comprise a tampering monitoring unit 161 arranged to monitor the secured module 16 for tampering attempts. In case a tampering attempt to the secured module 16 is detected, an alarm signal is generated by the monitoring unit.

The tampering monitoring unit 161 may monitor any aspect of the secured module 16 suitable to detect tampering. In the shown example, for instance the electronic device 11 comprises a dedicated voltage supply Vsec arranged to supply the secured module 16 and the tampering monitoring unit 161 is connected to the dedicated voltage supply in order to detect changes in the voltage characteristic of a tampering attempt. In the shown example, the tampering monitoring unit 161 is connected to the dedicated voltage supply as well in order to be, for supplied with the dedicated voltage. Thus, the supply of the tampering monitoring unit 161 is monitored by the monitoring unit 161 as well. It will be apparent that the tampering monitoring unit 161 may monitor any other aspect of the secure module suitable to detect tampering, and for example comprise one or more sensors designed to detect various forms of tampering, such as fluctuations in temperature, x-ray, voltage, and power fluctuations, or be connected to receive signals from such sensors. The sensors may for example be temperature sensors, voltage sensors, physical penetration sensors, and other environmental and electrical sensors.

The tampering monitoring unit 161 may be internal or external to the secured module. In the shown example, the tampering monitoring unit 161 is external to the secured module 16 and a connection is provided which connects the monitoring unit 161 to the secured module 16. In the example, the connection bypasses the interface 12 in order to allow alarm signals generated by the monitoring unit 161 to be passed to a secured data protection unit 162 in case a tampering attempt to the secured module 16 is detected.

The shown example of an electronic device 11 comprises a secured data protection unit 162 connected to the monitoring unit 161 and arranged to take protective measures with the secured data in response to receiving the alarm signal. The protective measures may be any type of measures comprise suitable to protect the secured data, such as for example erasing critical data stored in the secured module 16. In the shown example, the secured module 16 comprises a secured memory 160 which contains the critical data. In response to receiving the alarm signal the critical data is erased from the memory 160 by the secured data protection unit 162. However, it will be apparent that additionally or alternatively other suitable protective measures may be taken, such as switching off the secured module, destructing access keys for data or otherwise.

Figure 2:
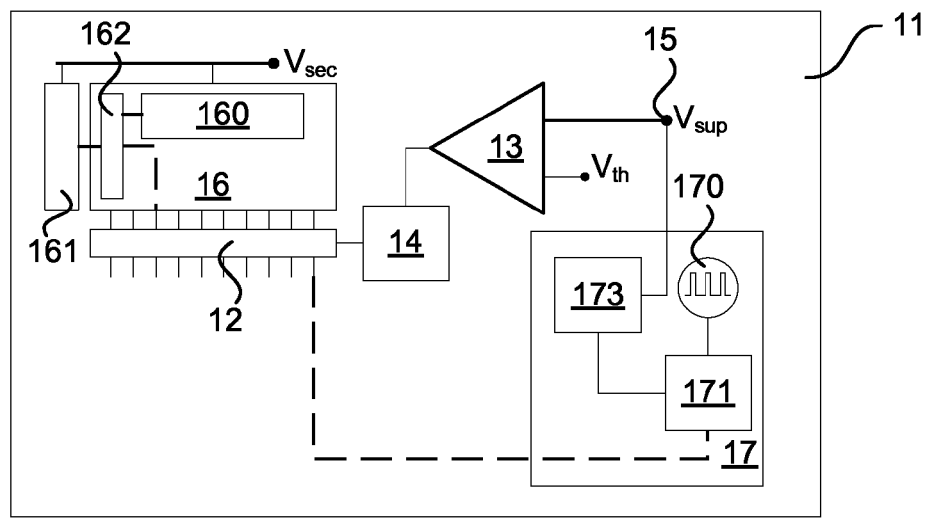
FIG. 2 schematically shows a block diagram of a second example of an embodiment of an electronic device.

As shown with the example of a electronic device 11 in FIG. 2, the electronic device may comprise a mode control unit 171 arranged to control the component 17 to be in a selected operating mode, for example selected out of a group comprising: the normal operating mode and a low-power mode, such as sleep mode, drowsy mode, or power gated mode.

The shown mode control unit 171 is connected to the secured module 16 and can cause transmission, when the component 17 is in the normal operating mode and the operating voltage is above the predetermined secure access voltage, to the secured module 16 of a low power mode signal indicating a change of the operating mode to the low power mode. The secured data protection unit 162 is connected to the mode control unit 171, and triggering the protective measures as reaction to an entry into low power mode (with associated change of supply voltage for the secured module) is inhibited in response to receiving the low power mode signal. For example, the secured data protection unit 162 may be disabled or the tamper monitoring unit may adjusted to disregard the change of voltage associated with entry into a low power mode.

Thereby, suitable measures may be taken to avoid undesired triggering of the protection mechanisms of the secured module 16, due to for example the change in operating voltage associated with the change in power mode causing being regarded as a tampering event and triggering the protection mechanisms.

As further shown in the example, the electronic device 11 comprises a clock circuit 170 arranged to provide a clock signal to the component 17, which is stopped when entering the low power mode. The mode control unit 171 is arranged to output the low power mode signal after the clock signal is stopped. Thereby, deactivation of the protection mechanisms while the component 17 is still in normal operating mode can be avoided and accordingly unauthorized access to the secured module 16 be inhibited.

In the shown example, the mode control unit 171 is connected to the operating voltage control module 173. The mode control unit 171 outputs to the operating voltage control module 173 a signal indicating that the operating voltage is to be the secure access voltage prior to sending the low power mode signal, in order to enable access to the secured module through the interface 12. In response to receiving the signal, the operating voltage control module 173 sets the supply voltage to the secured access voltage, and interface access is enabled in response.

Figure 3:
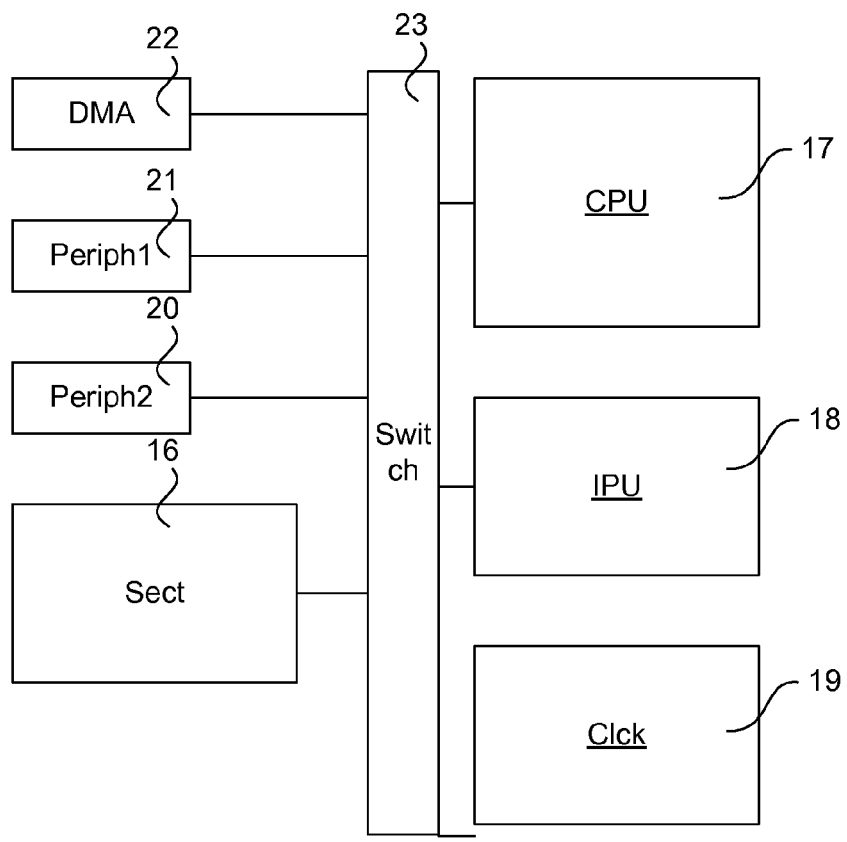
FIG. 3 schematically shows a block diagram of a third example of an embodiment of an electronic device.

Referring to FIG. 3, the example of an electronic device 10 shown therein is a microprocessor. The microprocessor may for example be an application processor, such as a multimedia processor. The shown microprocessor comprises several modules 17-22. As shown, a bus 23 connects the different modules to each other, and allows an exchange of information between the modules.

In the shown example, the modules comprise a single processing core or central processing unit, CPU, 17. However, the microprocessor may have two or more processing cores. The modules may further comprise one or more hardware accelerators, such as an image processing unit 18 which provides hardware acceleration for image processing. However, other hardware accelerators may also be used such as a video processing accelerator or a 3 dimensional graphics accelerator. The modules may comprise other modules as well such as in the shown example, a clock system 19 which provides and controls the clocks in the microprocessor or a direct memory access module 22. The microprocessor may, as shown have further peripheral modules 20,21.

The microprocessor further comprises a secured module 16, which may e.g. be implemented as shown in FIG. 1 or 2, with the interface 12 connected to the bus 23. The secured module 16 may for example be a security assurance hardware module designed to safely hold sensitive data, such as encryption keys, digital right management (DRM) keys, passwords and biometrics reference data. The secured module 16 may further feature a key encryption module (KEM) that allows non-volatile (external memory) storage of any sensitive data that is temporarily not in use, e.g. in encrypted form. The KEM may e.g. utilize a device-specific hidden secret key and a symmetric cryptographic algorithm to transform the sensitive data into encrypted data which is then stored on the external memory, thereby preventing access to the data when not used by the external memory.

Figure 4:
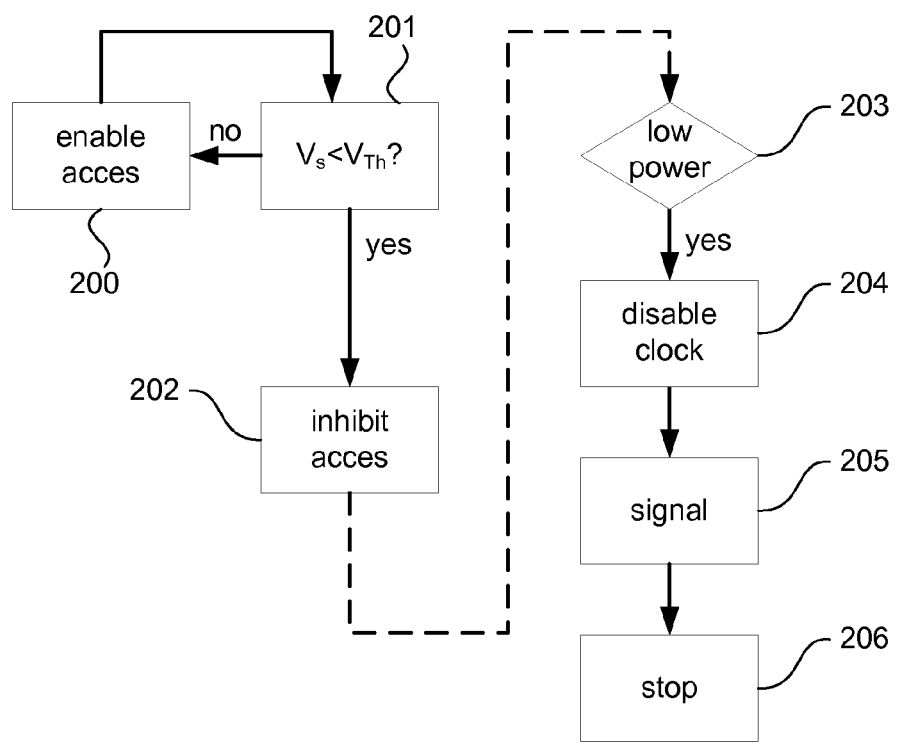
FIG. 4 schematically shows a flow chart of an example of a method of operating an electronic device.

The examples of electronic devices shown in FIG. 1 or 2 may perform a method as illustrated with the flow chart of FIG. 4. In the example illustrated in FIG. 4, the operating voltage is monitored at 201 and access is enabled in 200 if the operating voltage is above a predetermined secured access voltage level $V_{th}$. If the operating voltage is below the predetermined secured access voltage level $V_{th}$, i.e. $V_s < v_{th}$, access to the secured module 16 through the interface 12 is inhibited. As indicated with the dashed line, when the component 17 is going into low power mode, at 203, first the clock is disabled at 204 and at 205 a low power mode signal is provided to the secured module to indicate that the electronic device goes into low power mode. In response to providing the low power mode signal, the tamper protection is adapted to avoid activation by the change in the supply voltage of the secured module when going into low power mode.

The invention may also be implemented in a computer program stored on a medium readable by the electronic device of any one of the preceding claims, comprising functional descriptive material that, when executed by the electronic device, causes the electronic device to perform a method according to the invention, such as performing actions comprising: setting the operating voltage to the secure access voltage level and allowing access to the secured module through the interface, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

The computer system may for instance include at least one processing unit, associated memory and a number of input/output (I/O) devices. When executing the computer program, the computer system processes information according to the computer program and produces resultant output information via I/O devices.

In the foregoing specification, the invention has been elucidated with reference to specific examples of embodiments of the invention. It will, however, be evident that various modifications and changes may be made therein without departing from the broader scope of the invention as set forth in the appended claims, which shall not be interpreted as being limited to the examples described or shown.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the tamper monitoring unit 161 and the secured data protection unit 162 may be integrated in a single logic block and/or be internal to the secured module 16.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type. Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. An electronic device, comprising:
    a secured module arranged to store secured data;
    a component outside the secured module, said component having a normal operating mode with a normal mode operating voltage;
    an interface arranged to access said secured module;
    a voltage monitoring unit connected to said component, arranged to monitor an operating voltage of said component;
    an interface control unit connected to said voltage monitoring unit and said interface, arranged to inhibit access to said secured module through said interface when said operating voltage is below a predetermined secure access voltage level, said secure access voltage being higher than said normal mode operating voltage.

2. The electronic device of claim 1, wherein said component has, in addition to said normal operating mode, non-normal operating modes with operating voltages below said normal mode operating voltage.

3. The electronic device of claim 1, comprising:
    a mode control unit arranged to control the component to be in a selected operating mode selected out of a group comprising: said normal operating mode and a low-power mode;

said mode control unit being connected to said secured module for transmitting, when said component is in said normal operating mode and said operating voltage is above the predetermined secure access voltage, to said secured module a low power mode signal indicating a change of said operating mode to said low power mode.

4. The electronic device of claim 3, comprising a clock circuit arranged to provide a clock signal to said component and wherein said mode control unit is arranged to output said low power mode signal after said clock signal is stopped.

5. The electronic device of claim 3, wherein said low power mode is at least one of the group comprising of: sleep mode, drowsy mode, power gated mode.

6. The electronic device of claim 1, comprising a tampering monitoring unit arranged to monitor said secured module for tampering attempts and a connection which connects said monitoring unit to said secured module, said connection bypassing said interface, for transmitting an alarm signal generated by said tampering monitoring unit in case a tampering attempt is detected to said secured module.

7. The electronic device of claim 6, comprising a secured data protection unit connected to said tampering monitoring unit, arranged to take protective measures with said secured data in response to receiving said alarm signal.

8. The electronic device of claim 7, wherein the secured data protection unit is connected to the mode control unit, and said triggering of said protective measures as a reaction to selecting the low power mode is inhibited.

9. The electronic device of claim 7, wherein said protective measures comprise erasing critical data stored in said secured module.

10. The electronic device of claim 1, implemented as one or more of the group consisting of: integrated circuit, system-on-a-chip, microprocessor, battery powered device.

11. The electronic device of claim 1, wherein said component is a processor core.

12. The electronic device of claim 1, wherein said secure access voltage is below of a maximum operating voltage for said normal operating mode.

13. The electronic device of claim 1, comprising an operating voltage control module arranged to control said operating voltage to be set to said secure access voltage in case access to said secured module through said interface is requested.

14. The electronic device of claim 1, comprising a dedicated voltage supply arranged to supply said secured module, and wherein said voltage monitoring unit is connected to said dedicated voltage supply, for supplying said voltage monitoring unit.

15. A computer program product stored in a non-transitory medium readable by the electronic device of claim 1, comprising functional descriptive material that, when executed by the electronic device, causes the electronic device to perform actions comprising: setting said operating voltage to said secure access voltage level and allowing access to said secured module through said interface.

16. A method comprising:
storing secured data at a secured module;
monitoring an operating voltage of a component outside the secured module, said component having a normal operating mode with a normal mode operating voltage; and
inhibiting access to said secured module by an interface when said operating voltage is below a predetermined secure access voltage level, said secure access voltage being higher than said normal mode operating voltage.

17. The method of claim 16, wherein said component has, in addition to said normal operating mode, non-normal operating modes with operating voltages below said normal mode operating voltage.

18. The method of claim 16, further comprising:
transmitting to said secured module a low power mode signal indicating a change of operating mode from said normal operating mode to a low power mode when said component is in said normal operating mode and said operating voltage is above the predetermined secure access voltage.

19. The method of claim 18, further comprising transmitting said low power mode signal after a clock circuit has stopped providing a clock signal to said component.

20. The method of claim 18, further comprising inhibiting triggering a protective measure with said secured data in response to receiving an alarm signal from a tampering monitoring unit when operating in the low power mode.

* * * * *